(12) United States Patent
Shubin et al.

(10) Patent No.: US 9,164,231 B2
(45) Date of Patent: Oct. 20, 2015

(54) ULTRA-COMPACT PHOTODETECTOR ON AN OPTICAL WAVEGUIDE

(75) Inventors: Ivan Shubin, San Diego, CA (US); John E. Cunningham, San Diego, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 564 days.

(21) Appl. No.: 13/205,484

(22) Filed: Aug. 8, 2011

(65) Prior Publication Data

US 2013/0039614 A1    Feb. 14, 2013

(51) Int. Cl.
G02B 6/12      (2006.01)
G02B 6/42      (2006.01)
G02B 6/122     (2006.01)

(52) U.S. Cl.
CPC .......... *G02B 6/12004* (2013.01); *G02B 6/4214* (2013.01); *G02B 6/1228* (2013.01)

(58) Field of Classification Search
USPC ............................................... 385/14, 49, 88
See application file for complete search history.

(56) References Cited

U.S. PATENT DOCUMENTS

| | | | | |
|---|---|---|---|---|
| 5,071,213 | A * | 12/1991 | Chan | 385/52 |
| 5,170,448 | A * | 12/1992 | Ackley et al. | 385/31 |
| 5,182,787 | A * | 1/1993 | Blonder et al. | 385/131 |
| 5,446,814 | A * | 8/1995 | Kuo et al. | 385/31 |
| 5,764,832 | A * | 6/1998 | Tabuchi | 385/49 |
| 5,786,925 | A * | 7/1998 | Goossen et al. | 359/245 |
| 6,108,472 | A * | 8/2000 | Rickman et al. | 385/48 |
| 6,512,861 | B2 * | 1/2003 | Chakravorty et al. | 385/14 |
| 6,567,590 | B1 * | 5/2003 | Okada et al. | 385/49 |
| 6,947,645 | B2 * | 9/2005 | Korenaga et al. | 385/49 |
| 7,239,767 | B2 * | 7/2007 | Kim et al. | 385/14 |
| 7,250,317 | B2 * | 7/2007 | Heideman | 438/31 |
| 7,376,308 | B2 * | 5/2008 | Cheben et al. | 385/37 |
| 7,529,439 | B2 * | 5/2009 | Kim et al. | 385/14 |
| 7,687,301 | B2 * | 3/2010 | Martini et al. | 438/57 |
| 7,796,851 | B2 * | 9/2010 | Yonekura et al. | 385/47 |
| 2003/0123819 | A1 * | 7/2003 | Nakanishi et al. | 385/92 |
| 2004/0131302 | A1 * | 7/2004 | Kouta et al. | 385/14 |
| 2006/0215982 | A1 * | 9/2006 | Umezawa | 385/146 |

OTHER PUBLICATIONS

Zheng, Xuezhe et al., "Optical Proximity Communication Using Reflective Mirrors", Sep. 15, 2008, vol. 16, No. 19.
Yang, B. et al., "10-Gb/s All-Silicon Optical Receiver", IEEE Photonics Technology Letters, vol. 15, No. 5, May 2003, pp. 745-747.
Yin, Tao et al., "31GHz Ge n-i-p waveguide photodetectors on Silicon-on-Insulator substrate", Oct. 17, 2007, vol. 15, No. 21.

* cited by examiner

*Primary Examiner* — Daniel Petkovsek
(74) *Attorney, Agent, or Firm* — Park, Vaughan, Fleming & Dowler LLP; Steven E. Stupp

(57) ABSTRACT

An integrated circuit is described. This integrated circuit includes an optical waveguide defined in a semiconductor layer, and an optical detector disposed on top of the optical waveguide. Moreover, the optical waveguide has an end with a reflecting facet. For example, the reflective facet may be defined using an anisotropic etch of the semiconductor layer. This reflecting facet reflects light propagating in a plane of the optical waveguide out of the plane into the optical detector, thereby providing a photodetector with high optical responsivity, including an extremely low dark current (and, thus, high photosensitivity) and an extremely small capacitance (and, thus, high electrical bandwidth).

17 Claims, 5 Drawing Sheets

ULTRA-COMPACT PHOTODETECTOR ON AN OPTICAL WAVEGUIDE

GOVERNMENT LICENSE RIGHTS

The United States Government has a paid-up license in this invention and the right in limited circumstances to require the patent owner to license others on reasonable terms as provided for by the terms of Agreement No. HR0011-08-9-0001 awarded by the Defense Advanced Research Projects Administration.

BACKGROUND

1. Field

The present disclosure generally relates to optical-detector circuits. More specifically, the present disclosure relates to an optical-detector circuit that includes an ultra-compact photodetector implemented on top of an optical waveguide.

2. Related Art

Optical interconnects integrated with complementary metal-oxide-semiconductors (CMOS) can be used to provide on-chip and off-chip interconnects with communication bandwidths larger than a terabit-per-second. One of the key components that are needed to implement these optical systems are photodetectors (PDs). Typically, PDs are monolithically integrated in the same silicon layer as the transistors, as well as other optical and electronic components. Germanium is often used in PDs because it is an efficient absorbing material at infrared wavelengths (including the 1.5 µm band), and because it is available in the front-end CMOS manufacturing.

In general, there are two main configurations for PDs: surface-normal PDs, where the input optical light is directed perpendicularly to the PD top surface; and waveguide PDs, in which the optical light is coupled into an optical waveguide that is terminated with light-absorbing media to convert signals from the optical domain to the electrical domain. These two configurations have been demonstrated in silicon/germanium material systems with application in silicon photonics. In high-speed (but less than 10 Gb/sec) systems, the surface-normal PDs are usually either mesas or planar devices having a circular light-sensitive aperture with a 10-40 µm diameter. However, because the optical input fiber typically needs to be accurately aligned with the aperture, it is often difficult to reduce or scale down the physical size of the optical input fiber without complicating the mechanics of the optical-input-fiber light coupling.

Either of these PD configurations can be butt coupled or evanescently coupled to the absorbing germanium section. Evanescently coupled waveguide PDs are typically 20-40 µm long, with widths ranging from 500 nm to several microns. Note that the physical size of these PDs defines their effective absorption length, which usually cannot be further reduced without significantly decreasing the optical responsivity of the PD. Also note that a waveguide PD is often preferred over a surface-normal PD in a tightly integrated photonic on-chip system.

Because PDs with extremely low dark current are typically needed for high-fidelity systems, the germanium growth usually is carefully optimized to obtain high crystalline-material quality (which affects the dark current and the PD sensitivity). Furthermore, in order to minimize the bulk contribution to the dark current, germanium PDs are often mono-crystalline, with low defect density and low impurity levels. In addition, because the germanium sidewalls also contribute to the surface component of the dark current, the dark current is directly linked to device size. Consequently, increasing the area and/or the perimeter of a device usually increases the dark current, so minimizing the device size (without sacrificing the optical responsivity) typically improves performance.

Note that the capacitance of a PD influences its electrical bandwidth. In particular, devices with larger capacitance have slower response times. Because capacitance is proportional to the device area and inversely proportional to the device thickness, once again minimizing the device area typically increases the electrical bandwidth and, thus, has a positive effect on the performance of a PD. However, it is often difficult to modify the device thickness without affecting the optical responsivity. For example, in a surface-normal PD, a device thickness of nearly 3 µm is usually needed to absorb most of the incident optical photons. In contrast, in a waveguide PD, the device thickness can be reduced to 100 nm because the evanescent absorption on this length scale takes place in the optical-waveguide direction with an effective propagation length of 20-40 µm. Therefore, for a similar device area, a waveguide PD often has a larger capacitance and a smaller electrical bandwidth because of a thinner germanium junction.

Moreover, the photonic-component integration in the optical systems is often implemented in a hybrid fashion. This can be economically and/or technologically beneficial, especially when integrated components have to be manufactured separately because of incompatible processing conditions. For example, high-performance PDs and lasers can be efficiently fabricated using III-V materials on indium-phosphide substrates, while optical waveguides and passive-filtering components can be fabricated using silicon-on-insulator (SOI) technology.

The hybrid integration of these components (i.e., III-V to SOI or SOI to SOI) often requires routing optical signals from an optical-waveguide layer into the III-V based components. This routing of the light has been demonstrated using mirrors formed in SOI optical waveguides. In these existing approaches, the optical waveguide is terminated with 90° sidewall, and a tilted interface is micro-machined farther along the optical path to route the optical signal out of the plane. Note that this optical path includes the distance between the terminated optical waveguide and the mirror, and from the mirror into the PD (or a matching mirror). However, for a typical configuration, this optical path is several to tens of microns long, which often results in signal loss due to optical diffraction.

Hence, what is needed is an optical-detector circuit that does not suffer from the above-described problems.

SUMMARY

One embodiment of the present disclosure provides an integrated circuit that includes an optical waveguide defined in a semiconductor layer, and an optical detector disposed on top of the optical waveguide. Moreover, the optical waveguide has an end with a reflecting facet. This reflecting facet reflects light propagating in a plane of the optical waveguide out of the plane into the optical detector.

Note that the semiconductor layer may include silicon and/or the optical detector may include germanium. Furthermore, the integrated circuit may include: a substrate; and a buried-oxide layer disposed on the substrate, where the semiconductor layer is disposed on the buried-oxide layer. Additionally, the substrate may include a semiconductor. Consequently, the substrate, the buried-oxide layer and the semiconductor layer may comprise a silicon-on-insulator technology.

In some embodiments, the reflective facet is defined using an anisotropic etch of the semiconductor layer. For example, the reflecting facet may have an angle of approximately 54.74°.

Moreover, the optical detector may include a PIN photodetector and/or an avalanche photodetector. Additionally, the optical detector may absorb the light in one pass or multiple passes through the optical detector.

Another embodiment provides a system that includes the integrated circuit.

Another embodiment provides a method for providing an electrical signal in an integrated circuit. During this method, an optical signal is conveyed in a plane of the optical waveguide disposed in the semiconductor layer in the integrated circuit, where the optical waveguide has the end with the reflecting facet. Then, the optical signal is reflected out of the plane of the optical waveguide into the optical detector using the reflecting facet. Next, the electrical signal corresponding to the optical signal is provided using the optical detector.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

Embodiments of an integrated circuit, a system that includes the integrated circuit, and a method for providing an electrical signal in the integrated circuit are described. This integrated circuit includes an optical waveguide defined in a semiconductor layer, and an optical detector disposed on top of the optical waveguide. Moreover, the optical waveguide has an end with a reflecting facet. For example, the reflective facet may be defined using an anisotropic etch of the semiconductor layer. This reflecting facet reflects light propagating in a plane of the optical waveguide out of the plane into the optical detector.

By reflecting the light out of the plane of the waveguide into the optical detector, this optical-detection technique may solve the problem of integrating a photodetector (PD) with on-chip optical waveguides and additional electrical components. In particular, the configuration in the integrated circuit provides a PD with high optical responsivity, including an extremely low dark current (and, thus, high photosensitivity) and an extremely small capacitance (and, thus, high electrical bandwidth).

Figure 1:
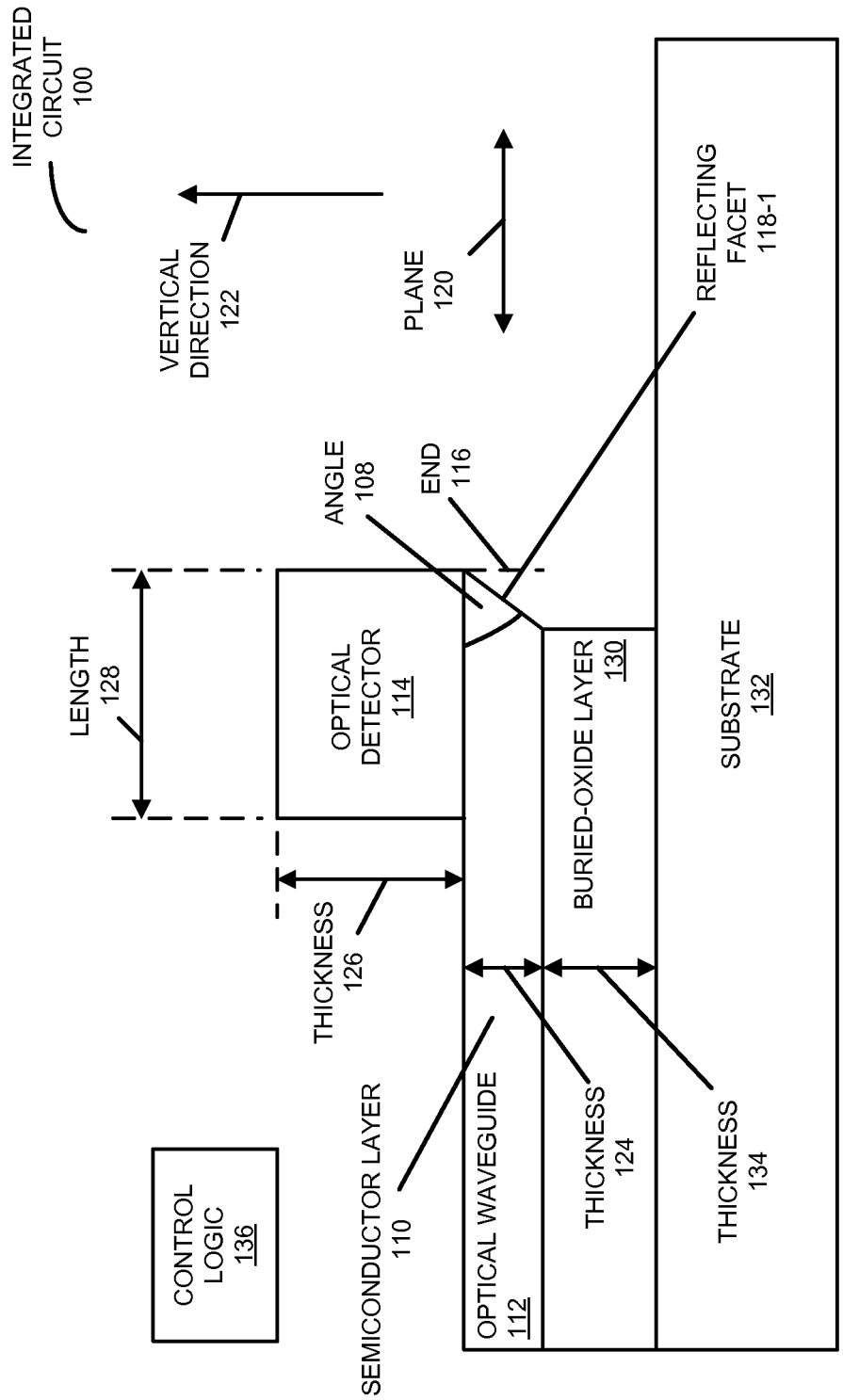
FIG. 1 is a block diagram illustrating a side view of an integrated circuit in accordance with an embodiment of the present disclosure.

We now describe embodiments of the integrated circuit. FIG. 1 presents a block diagram illustrating a side view of an integrated circuit 100. In this integrated circuit, an optical waveguide 112 is defined in a semiconductor layer 110. Note that in optical waveguide 112 an optical signal or light is highly confined because of the big difference between the index of refraction of semiconductor layer 110 and the surrounding material.

Optical waveguide 112 has an end 116 with a reflecting facet 118 (and, in particular, an inverted reflecting facet). This reflecting facet has an angle 108 that reflects the incoming light propagating in a plane 120 of optical waveguide 112 out of the plane (i.e., along vertical direction 122) into optical detector 114 (i.e., a PD), which is disposed on top of optical waveguide 112.

In some embodiments, reflective facet 118 is defined using an anisotropic etch of semiconductor layer 110, such as a crystal-plane-selective anisotropic wet etch. For example, reflecting facet 118 may have angle 108 of approximately 54.74° with respect to the surface of optical waveguide 112. Note that, because of total internal reflection, angle 108 may ensure that all of the incoming light is reflected up toward optical detector 114 regardless of the light polarization. (In embodiments in which optical detector 114 includes germanium and semiconductor layer 110 includes silicon, after reflecting off of reflecting facet 118 a very small percentage of the light will reflect back into optical waveguide 112 at the interface with optical detector 114 because of the small difference in the index of refraction of these materials. However, the light will be redirected back to this interface after total internal reflection from the silicon interface with buried-oxide layer 130, which is described further below.)

In optical detector 114, the light is absorbed and converted into an electrical signal (i.e., the information conveyed by photons may be output by optical detector 114 using charge carriers, such as electrons). Therefore, optical detector 114 may include a PIN PD and/or an avalanche PD. In the avalanche PD embodiments, optical detector 114 may operate as a separate absorption and multiplication device, for example, absorbing light in a germanium layer while experiencing gain from a silicon optical waveguide for an improved noise figure. However, more generally, a variety of monolithic integrated surface-normal optical detectors may be used.

Additionally, optical detector 114 may absorb the light in one pass or multiple passes through optical detector 114. Stated differently, thickness 126 of optical detector 114 may be selected such that the light is fully absorbed before it reflects off of a top surface of optical detector 114, or it may be fully absorbed after it reflects off of a top surface of optical detector 114. For example, thickness 126 may be less than 5 µm, which is less than the length of existing waveguide PDs. While this height is comparable to that of a surface-normal PD for high optical responsivity, it is in fact thinner because of the off-normal angle of entry of the light into optical detector 114.

Therefore, integrated circuit 100 may significantly reduce the area of the PD while maintaining a waveguide-compatible configuration. Consequently, integrated circuit 100 may combine the benefits of both the surface-normal and waveguide PDs. This approach also allows an optical waveguide (such as a silicon optical waveguide) to be seamlessly and homogeneously integrated with a germanium PD (such as optical detector 114).

While a wide variety of materials can be used in semiconductor layer 110 in integrated circuit 100, in an exemplary embodiment silicon is used. Furthermore, this silicon semiconductor layer may be disposed on a buried-oxide layer 130, which, in turn, is disposed on a substrate 132. Once again, a wide variety of materials may be used in substrate 132, such as a semiconductor, glass or plastic. In an exemplary embodiment, silicon is used in substrate 132, along with silicon dioxide in buried-oxide layer 130. Consequently, in some embodiments, substrate 132, buried-oxide layer 130 and semiconductor layer 110 may comprise a silicon-on-insulator (SOI) technology.

Figure 2:
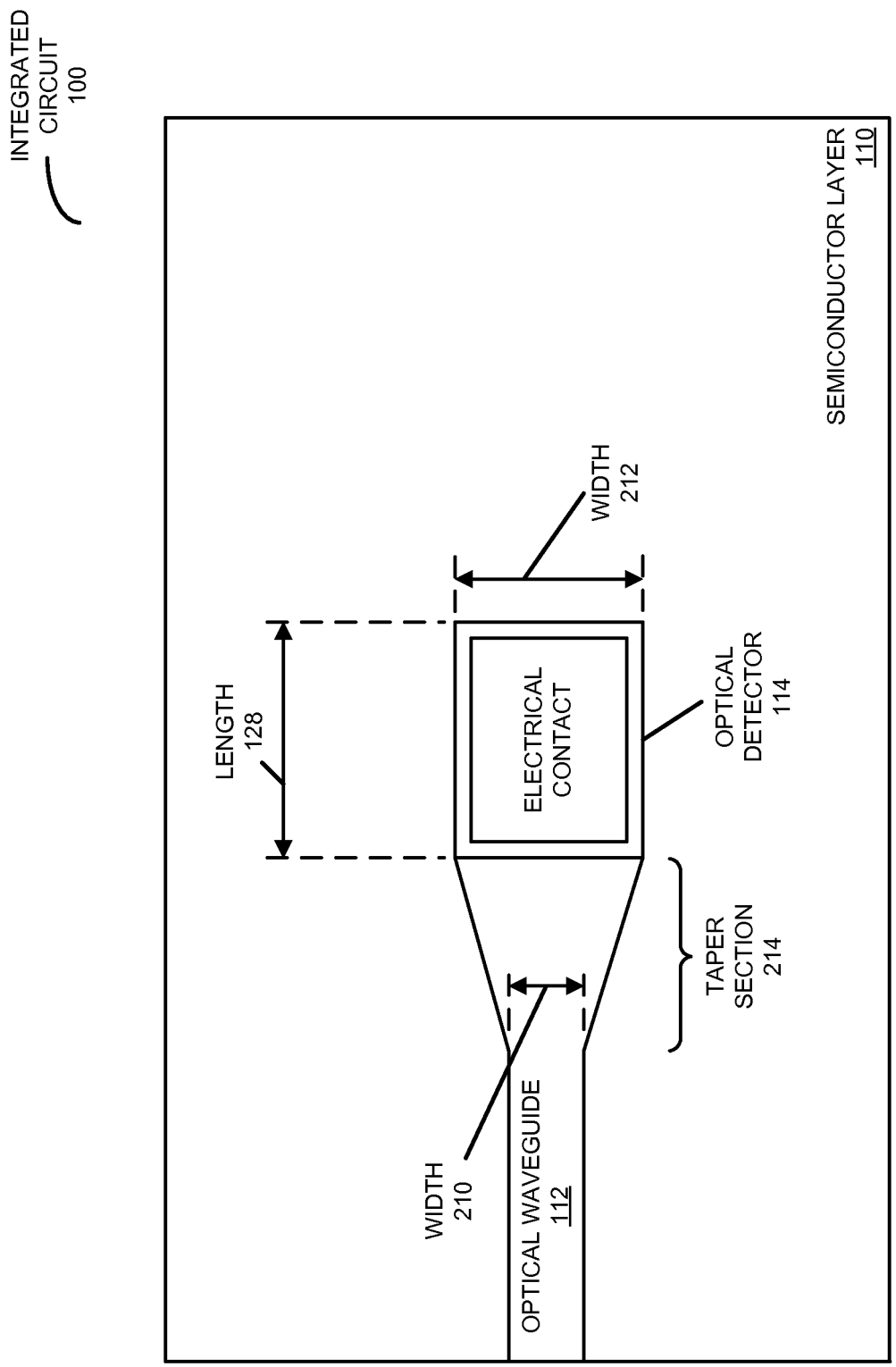
FIG. 2 is a block diagram illustrating a top view of the integrated circuit in FIG. 1 in accordance with an embodiment of the present disclosure.

In an exemplary embodiment, optical waveguide 112 conveys an optical signal (i.e., light) having wavelengths between 1.1-1.7 μm, such as an optical signal having a fundamental wavelength of 1.3 or 1.55 μm. This optical waveguide may have a thickness 124 between 0.25 and 3 μm, and a width 210 (as shown in FIG. 2, which presents a block diagram illustrating a top view of integrated circuit 100) between 0.5 and 3 μm. Note that because optical waveguide 112 may have a quasi-rectangular cross-section, it may be a quasi-single mode component. Moreover, buried-oxide layer 130 may have a thickness 134 between 0.3 and 3 μm.

Furthermore, because germanium absorbs light having wavelengths in the vicinity of 1.55 μm entirely within 5 μm (although 4 μm is sufficient for 90% optical responsivity), thickness 126 may be 2 μm so that light passing up and down (i.e., 2 passes) through optical detector 114 may be absorbed. In other embodiments, thickness 126 may be n-times smaller, allowing the light to be absorbed in 2n-passes at the expense of a slower response time. In general, thickness 126 may be between 0.5 and 3.5 μm, length 128 may be between 3 and 6 μm, and width 212 (FIG. 2) may be between 2 and 5 μm (with or without a two or three-dimensional taper section 214 of optical waveguide 112 proximate to optical detector 114 in FIG. 2). Note that, because of reduced length 128 (by approximately 5-10×) and increased effective junction thickness (by approximately 3-5×), the overall capacitance of optical detector 114 may be reduced by at least an order of magnitude relative to existing waveguide PDs, thereby increasing the electrical bandwidth. In addition, the reduced area of optical detector 114 may result in a proportionately lower dark current and higher optical sensitivity.

In some embodiments, optical detector 114 may be turned 'on' or 'off' (i.e., it may or may not detect the light) based on an applied voltage (and, more generally, based on a signal, such as an electrical signal) that is controlled by control logic 136.

Figure 3:
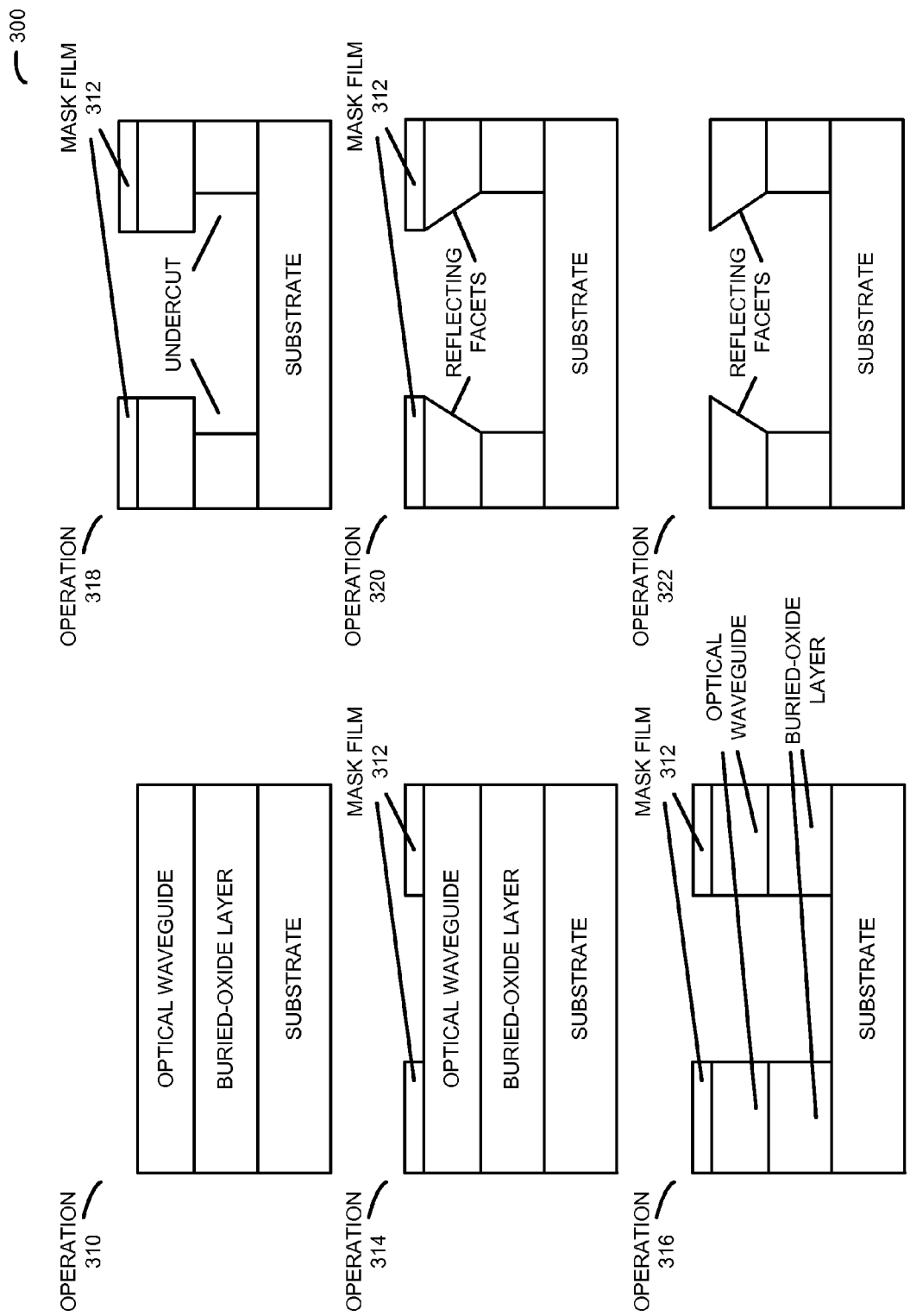
FIG. 3 is a block diagram illustrating a method for fabricating the integrated circuit in FIG. 1 in accordance with an embodiment of the present disclosure.

We now describe embodiments of a method for fabricating integrated circuit 100 (FIGS. 1 and 2). FIG. 3 presents a block diagram illustrating a method 300 for fabricating integrated circuit 100 (FIGS. 1 and 2). An optical waveguide is fabricated on a buried-oxide layer (operation 310). Then, a hard mask film 312 (such as silicon nitride) is coated conformally on the optical waveguide and/or the silicon-on-insulator slab (operation 314), and this film may be patterned to form open windows located where the reflecting facet is to be fabricated.

Subsequently, exposed silicon and the underlying buried-oxide layer are directionally etched with a dry etch down to the silicon substrate (operation 316). This dry-etch process may be carried out with a fluorine gas (such as $CF_4$, $CHF_3$, $SF_6$, etc.) in a reactive-ion or an inductively coupled plasma system. Next, the buried-oxide layer is etched to form an undercut using a buffered-oxide etch (or other possible wet or dry chemistry that has high selectivity to silicon) so that the optical waveguide and the substrate remain intact (operation 318).

As shown in operation 320, inverted reflecting facets may be formed using an anisotropic wet-hydroxide etchant (such as KOH, TMAH, EDP, etc.). This anisotropic etch may be a result of the highly different etching rates of various silicon planes. Note that the etching may be eventually terminated by an exposed silicon <111> plane with a very negligible etch rate compared to other silicon planes, such as <100> and <110>, as well as a host of other higher planes. Because the sidewalls of the optical waveguide are fully masked by hard mask film 312 (such as silicon nitride), the anisotropic etching may start to shape the silicon optical waveguide from underneath, in the buried-oxide layer, resulting in the <111> inverted facet. Furthermore, hard mask film 312 may be subsequently removed (operation 322).

Note that the addition and patterning of the light-absorbing germanium layer in optical detector 114 (FIGS. 1 and 2) may occur before or after the fabrication of the inverted reflecting facet, for example, using a selective-area growth technique.

Figure 4:
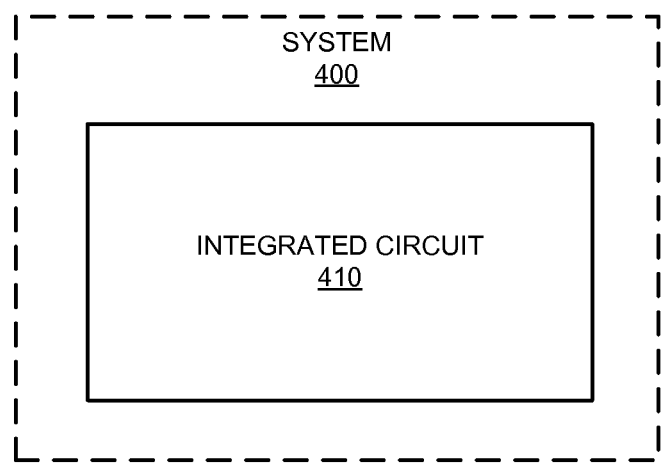
FIG. 4 is a block diagram illustrating a system that includes the integrated circuit of FIG. 1 in accordance with an embodiment of the present disclosure.

Integrated circuit 100 (FIG. 1) may be used in a variety of applications. This is shown in FIG. 4, which presents a block diagram illustrating a system 400 that includes an integrated circuit 410. System 400 may include: a VLSI circuit, a switch, a hub, a bridge, a router, a communication system, a storage area network, a data center, a network (such as a local area network), and/or a computer system (such as a multiple-core processor computer system). Furthermore, the computer system may include, but is not limited to: a server (such as a multi-socket, multi-rack server), a laptop computer, a communication device or system, a personal computer, a work station, a mainframe computer, a blade, an enterprise computer, a data center, a portable-computing device, a supercomputer, a network-attached-storage (NAS) system, a storage-area-network (SAN) system, and/or another electronic computing device. Note that a given computer system may be at one location or may be distributed over multiple, geographically dispersed locations.

Integrated circuit 100 (FIGS. 1 and 2), as well as system 400, may include fewer components or additional components. Although these embodiments are illustrated as having a number of discrete items, these integrated circuits and the system are intended to be functional descriptions of the various features that may be present rather than structural schematics of the embodiments described herein. Consequently, in these embodiments two or more components may be combined into a single component, and/or a position of one or more components may be changed. In addition, functionality in the preceding embodiments of the integrated circuits and the system may be implemented more in hardware and less in software, or less in hardware and more in software, as is known in the art. For example, functionality may be implemented in one or more application-specific integrated circuits (ASICs) and/or one or more digital signal processors (DSPs).

While the preceding embodiments have been illustrated with particular elements and compounds, a wide variety of materials and compositions (including stoichiometric and non-stoichiometric compositions) may be used, as is known to one of skill in the art. Furthermore, these materials and compounds may be fabricated using a wide variety of processing techniques, including: evaporation, sputtering, molecular-beam epitaxy, wet or dry etching (such as photolithography or direct-write lithography), polishing, etc.

Figure 5:
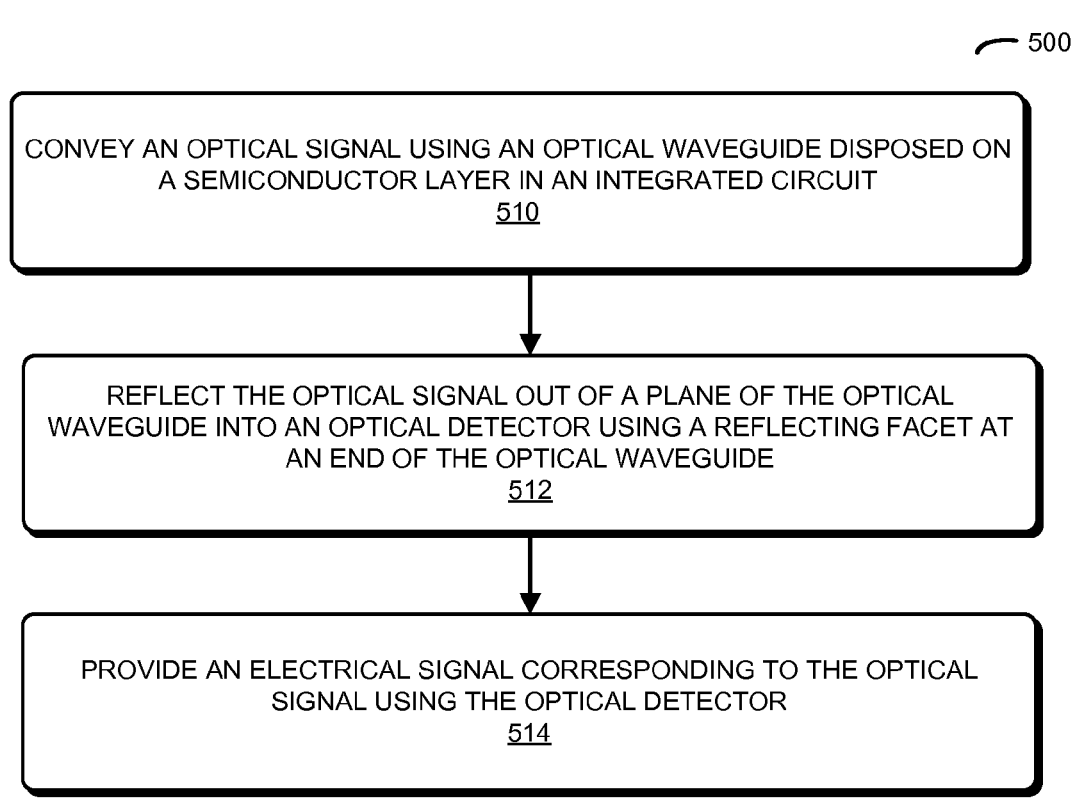
FIG. 5 is a flow chart illustrating a method for providing an electrical signal in the integrated circuit of FIG. 1 in accordance with an embodiment of the present disclosure.

We now describe embodiments of a method for detecting an optical signal. FIG. 5 presents a flow chart illustrating a method 500 for providing an electrical signal using an integrated circuit, such as integrated circuit 100 (FIGS. 1 and 2). During the method, an optical signal is conveyed in a plane of the optical waveguide disposed in the semiconductor layer in the integrated circuit (operation 510), where the optical waveguide has the end with the reflecting facet. Then, the optical signal is reflected out of the plane of the optical waveguide into the optical detector using the reflecting facet (operation 512). Next, the electrical signal corresponding to the optical signal is provided using the optical detector (operation 514).

In some embodiments of methods 300 (FIG. 3) and/or 500, there are additional or fewer operations. Moreover, the order of the operations may be changed, and/or two or more operations may be combined into a single operation.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An integrated circuit, comprising:
    an optical waveguide defined in a semiconductor layer, wherein the optical waveguide defines an optical waveguide propagation axis, wherein the optical waveguide has an end with a reflecting facet, and wherein the reflecting facet has an angle of approximately 54.74° with respect to the optical waveguide propagation axis; and
    an optical detector disposed on top of the optical waveguide, wherein a bottom surface of the optical detector is in direct physical contact with a top surface of the optical waveguide, wherein the reflecting facet is configured to reflect light from the optical waveguide into the optical detector, wherein refractive indices of the optical waveguide and the optical detector are approximately equal, thereby causing light propagating in the optical waveguide along the optical waveguide propagation axis to be reflected by the reflecting facet so that the reflected light enters and propagates in the optical detector at an angle of approximately 70.52° with respect to the bottom surface of the optical detector;
    wherein the optical waveguide has a thickness between 0.25 µm and 3 µm measured along a first direction that is normal to the top surface of the optical waveguide, wherein the optical waveguide has a width between 0.5 µm and 3 µm measured along a second direction that is parallel to the top surface of the optical waveguide and perpendicular to the optical waveguide propagation axis, wherein the optical detector has a thickness between 0.5 µm and 3.5 µm measured along the first direction, wherein the optical detector has a width between 2 µm and 5 µm measured along the second direction, and wherein the optical detector has a length between 3 µm and 6 µm measured along the optical propagation axis.

2. The integrated circuit of claim 1, wherein the semiconductor layer includes silicon.

3. The integrated circuit of claim 1, wherein the reflective facet is defined using an anisotropic etch of the semiconductor layer.

4. The integrated circuit of claim 1, wherein the optical detector includes germanium.

5. The integrated circuit of claim 1, wherein the optical detector includes one of a PIN photodetector and an avalanche photodetector.

6. The integrated circuit of claim 1, further comprising:
    a substrate; and
    a buried-oxide layer disposed on the substrate, wherein the semiconductor layer is disposed on the buried-oxide layer.

7. The integrated circuit of claim 6, wherein the substrate includes a semiconductor.

8. The integrated circuit of claim 6, wherein the substrate, the buried-oxide layer and the semiconductor layer comprise a silicon-on-insulator technology.

9. The integrated circuit of claim 1, wherein the optical detector is configured to absorb the light in one pass through the optical detector.

10. The integrated circuit of claim 1, wherein the optical detector is configured to absorb the light in multiple passes through the optical detector.

11. A system, comprising:
    a processor;
    a memory; and
    an integrated circuit associated with at least one of the processor and the memory, wherein the integrated circuit includes,
    an optical waveguide defined in a semiconductor layer, wherein the optical waveguide defines an optical waveguide propagation axis, wherein the optical waveguide has an end with a reflecting facet, and wherein the reflecting facet has an angle of approximately 54.74° with respect to the optical waveguide propagation axis, and
    an optical detector disposed on top of the optical waveguide, wherein a bottom surface of the optical detector is in direct physical contact with a top surface of the optical waveguide, wherein the reflecting facet is configured to reflect light from the optical waveguide into the optical detector, wherein refractive indices of the optical waveguide and the optical detector are approximately equal, thereby causing light propagating in the optical waveguide along the optical waveguide propagation axis to be reflected by the reflecting facet so that the reflected light enters and propagates in the optical detector at an angle of approximately 70.52° with respect to the bottom surface of the optical detector,
    wherein the optical waveguide has a thickness between 0.25 µm and 3 µm measured along a first direction that is normal to the top surface of the optical waveguide, wherein the optical waveguide has a width between 0.5 µm and 3 µm measured along a second direction that is parallel to the top surface of the optical waveguide and perpendicular to the optical waveguide propagation axis, wherein the optical detector has a thickness between 0.5 µm and 3.5 µm measured along the first direction, wherein the optical detector has a width between 2 µm and 5 µm measured along the second direction, and wherein the optical detector has a length between 3 µm and 6 µm measured along the optical propagation axis.

12. The system of claim 11, wherein the semiconductor layer includes silicon.

13. The system of claim 11, wherein the reflective facet is defined using an anisotropic etch of the semiconductor layer.

14. The system of claim 11, wherein the optical detector includes germanium.

15. The system of claim 11, further comprising:
    a substrate; and a buried-oxide layer disposed on the substrate, wherein the semiconductor layer is disposed on the buried-oxide layer.

16. The system of claim 15, wherein the substrate includes a semiconductor.

17. The system of claim 15, wherein the substrate, the buried-oxide layer and the semiconductor layer comprise a silicon-on-insulator technology.

* * * * *